(12) United States Patent
Kurashige

(10) Patent No.: US 8,364,930 B2
(45) Date of Patent: Jan. 29, 2013

(54) INFORMATION PROCESSING APPARATUS AND STORAGE DRIVE ADAPTED TO PERFORM FAULT ANALYSIS BY MAINTENANCE OF TRACING INFORMATION

(75) Inventor: Takehiko Kurashige, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 418 days.

(21) Appl. No.: 12/391,118

(22) Filed: Feb. 23, 2009

(65) Prior Publication Data

US 2009/0228666 A1 Sep. 10, 2009

Related U.S. Application Data

(63) Continuation of application No. PCT/JP2008/071178, filed on Nov. 14, 2008.

(30) Foreign Application Priority Data

Mar. 7, 2008 (JP) .................................. 2008-058544

(51) Int. Cl.
*G06F 12/02* (2006.01)

(52) U.S. Cl. . 711/173; 711/103; 711/219; 711/E12.008; 713/1; 714/45

(58) Field of Classification Search ......................... None
See application file for complete search history.

(56) References Cited

U.S. PATENT DOCUMENTS

| | | | |
|---|---|---|---|
| 4,819,154 A * | 4/1989 | Stiffler et al. ................... | 714/20 |
| 5,771,180 A | 6/1998 | Culbert | |
| 5,999,921 A | 12/1999 | Arsenault et al. | |
| 6,167,482 A | 12/2000 | Schmidt et al. | |
| 6,233,244 B1 * | 5/2001 | Runaldue et al. ............. | 370/412 |
| 6,266,789 B1 * | 7/2001 | Bucher et al. ................... | 714/39 |
| 6,412,089 B1 * | 6/2002 | Lenny et al. ................... | 714/769 |
| 7,062,675 B1 | 6/2006 | Kemeny et al. | |
| 7,227,788 B2 | 6/2007 | Suda et al. | |
| 7,730,293 B2 * | 6/2010 | Owhadi et al. ................... | 713/2 |
| 8,140,751 B1 * | 3/2012 | Wang ............................ | 711/114 |
| 2001/0020271 A1 | 9/2001 | Ito | |
| 2002/0129300 A1 * | 9/2002 | Floyd et al. ..................... | 714/39 |

(Continued)

FOREIGN PATENT DOCUMENTS

DE 102006039942 10/2007
JP 05-079649 3/1993

(Continued)

OTHER PUBLICATIONS

IBM. "Vancouver-II S.M.A.R.T. Design." Jul. 2002. IBM.*

(Continued)

*Primary Examiner* — Nathan N Sadler
(74) *Attorney, Agent, or Firm* — Blakely, Sokoloff, Taylor & Zafman LLP

(57) ABSTRACT

According to one embodiment, an information processing apparatus includes an information processing apparatus main body and a storage drive which is accommodated in the information processing apparatus body. The information processing apparatus main body includes a main control module which controls power activation of the storage drive based on a power activation operation by a power operation section. The storage drive includes a storage memory including a plurality of storage areas to and from which information can be written and read, a counter in which a count is incremented upon power activation, and a memory control module which stores a content of an access request in a storage area of the storage memory determined based on the count of the counter when the access request to the storage memory is made.

8 Claims, 6 Drawing Sheets

U.S. PATENT DOCUMENTS

| | | | |
|---|---|---|---|
| 2003/0028760 A1* | 2/2003 | Chang et al. | 713/2 |
| 2003/0067013 A1* | 4/2003 | Ichihara et al. | 257/200 |
| 2006/0039248 A1 | 2/2006 | Sasaki | |
| 2006/0095647 A1 | 5/2006 | Battaglia et al. | |
| 2006/0274565 A1 | 12/2006 | Takashima et al. | |
| 2006/0282696 A1 | 12/2006 | Inagaki | |
| 2007/0260811 A1 | 11/2007 | Merry, Jr. et al. | |
| 2008/0082735 A1 | 4/2008 | Shiga | |
| 2008/0140915 A1 | 6/2008 | Ju et al. | |
| 2008/0270816 A1 | 10/2008 | Wang | |
| 2009/0037654 A1* | 2/2009 | Allison et al. | 711/112 |
| 2009/0172211 A1 | 7/2009 | Perry et al. | |

FOREIGN PATENT DOCUMENTS

| | | |
|---|---|---|
| JP | 81-22467 | 5/1996 |
| JP | 8263939 | 10/1996 |
| JP | 09-097205 | 4/1997 |
| JP | 09-114695 | 5/1997 |
| JP | 2000-057060 | 2/2000 |
| JP | 2002-094493 | 3/2002 |
| JP | 2004-326243 | 11/2004 |
| JP | 2005-071068 | 3/2005 |
| JP | 2005-092678 | 4/2005 |
| JP | 2006-023815 | 1/2006 |
| JP | 2006-79543 | 3/2006 |
| JP | 2006-113961 | 4/2006 |
| JP | 2006-178555 | 7/2006 |
| JP | 2006-338789 | 12/2006 |
| JP | 2007-041233 | 2/2007 |
| JP | 2007-287022 | 11/2007 |
| JP | 2007-287026 | 11/2007 |
| JP | 2007-304920 | 11/2007 |
| JP | 2008-009594 | 1/2008 |
| WO | WO-2008/001649 | 1/2008 |

OTHER PUBLICATIONS

Matt Rooke. "Proposal for a General Purpose Logging Feature Set." Jul. 2000. T13 Technical committee. T13/E00138R0.*

Bary Alyssa Johnson. "Seagate Launches First Hybrid Hard Drive." Jun. 2006. PCMag. http://www.pcmag.com/article/print/180240.*

PCT Search Report in a corresponding Japanese application No. PCT/JP2008/071178 dated Feb. 17, 2009.

Japanese Patent Application No. 2009-506850, Notice of Reasons for rejection, mailed Jul. 12, 2011, (with English Translation).

PCT Search Report in a corresponding Japanese application No. PCT/JP2008/071175 dated Feb. 10, 2009.

PCT Search Report in a corresponding Japanese application No. PCT/JP2008/070720 dated Feb. 3, 2009.

PCT Search Report in a corresponding Japanese application No. PCT/JP2008/070722 dated Jan. 6, 2009.

Japanese Patent Application No. 2009-506850, Notice of Reasons for Rejection, Mailed Mar. 29, 2011 (Enblish Translation).

U.S. Appl. No. 12/391,126, Non-Final Office Action, mailed Jun. 13, 2011.

U.S. Appl. No. 12/390,269, Non-Final Office Action, mailed Mar. 25, 2011.

* cited by examiner

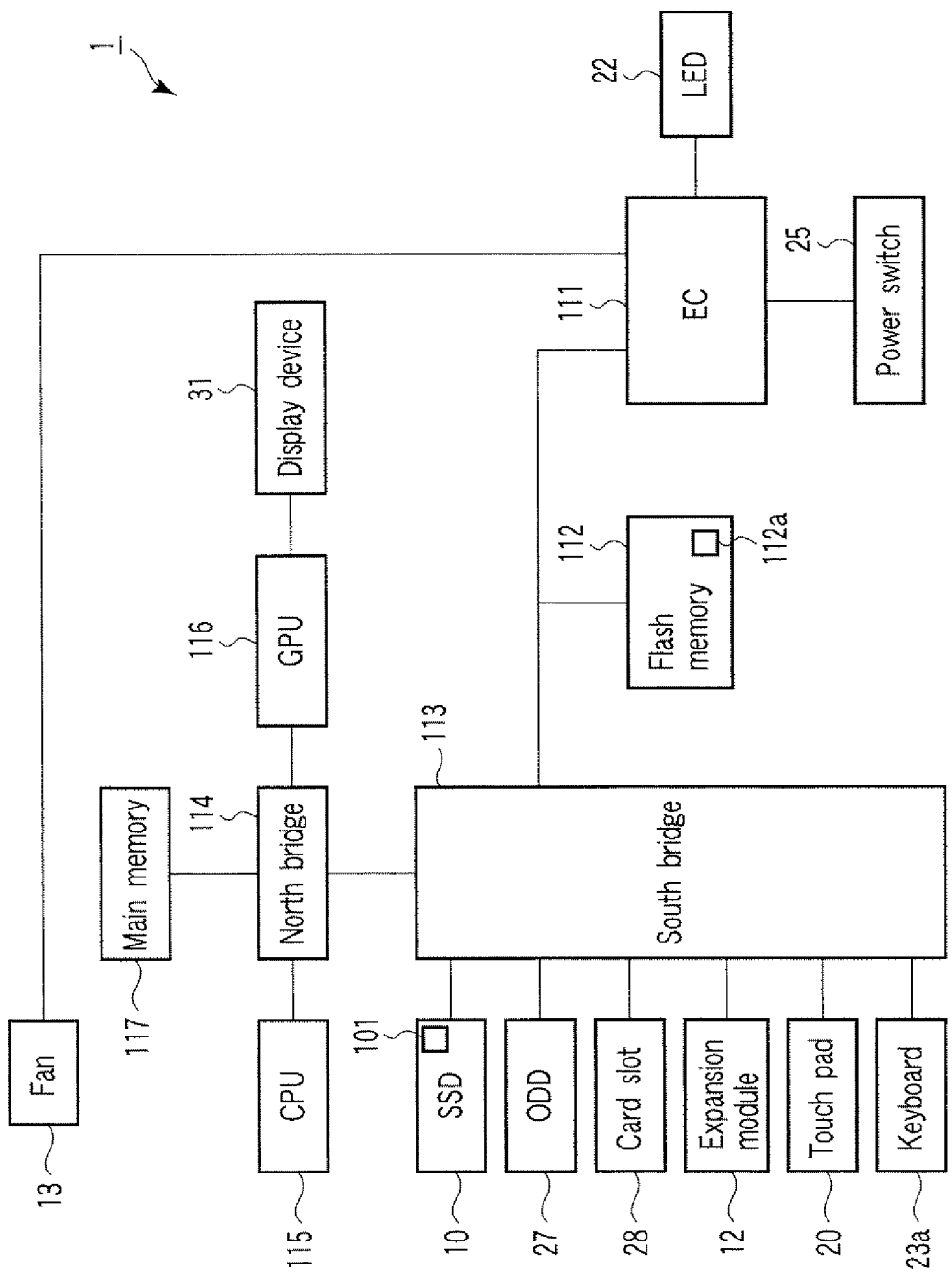
F I G. 2

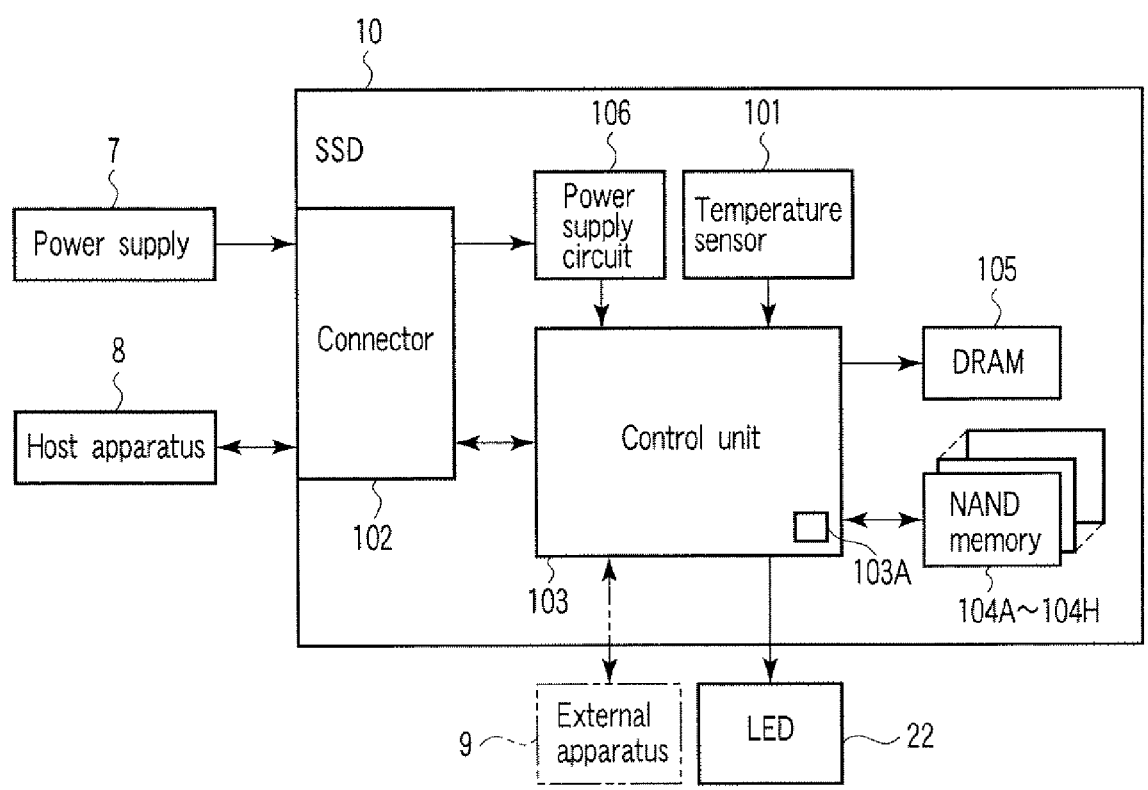
F I G. 3

INFORMATION PROCESSING APPARATUS AND STORAGE DRIVE ADAPTED TO PERFORM FAULT ANALYSIS BY MAINTENANCE OF TRACING INFORMATION

CROSS-REFERENCE TO RELATED APPLICATIONS

This is a Continuation Application of PCT Application No. PCT/JP2008/071178, filed Nov. 14, 2008, which was published under PCT Article 21(2) in English.

This application is based upon and claims the benefit of priority from prior Japanese Patent Application No. 2008-058544, filed Mar. 7, 2008, the entire contents of which are incorporated herein by reference.

BACKGROUND

1. Field

One embodiment of the present invention relates to an information processing apparatus and a storage drive.

2. Description of the Related Art

As a conventional technique, an information processing apparatus containing two processors each including a tracing write circuit and a tracer memory and having the same configuration and performing the same operation on a master side and a slave side has been disclosed (see Jpn. Pat. Appln. KOKAI Publication No. 9-114695, for example).

According to this information processing apparatus, the two processors trace the same trace information to make a double check in a normal operation, and perform tracing in different modes at the time of debugging or occurrence of faults.

The tracer write circuit on the master side writes tracing information instructed by a normal microprogram to the tracer memory. On the other hand, the tracer write circuit on the slave side extracts only a branch instruction in tracing information and writes the branch instruction to the tracer memory when instructed to write only a branch instruction by a tracer control signal, for example. Thereby, an advantage of obtaining tracing information for different purposes such as fault analysis can be attained.

Tracing information is also obtained when tracing information is extracted at the time of occurrence of faults. Therefore, there is the possibility that important tracing information essential for fault analysis does not remain in a conventional information processing apparatus (since tracing information obtained at the time of extraction of tracing information is overwritten).

The present invention has been made in consideration of the above, and an object of the invention is to provide an information processing apparatus and a storage drive capable of performing fault analysis by maintaining tracing information reliably.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing a schematic configuration of the information processing apparatus according to the embodiment;

FIG. 3 is an exemplary block diagram showing a schematic configuration of a solid-sate drive (SSD) according to the embodiment;

DETAILED DESCRIPTION

Various embodiments according to the invention will be described hereinafter with reference to the accompanying drawings. In general, according to one embodiment of the invention, an information processing apparatus includes an information processing apparatus main body and a storage drive which is accommodated in the information processing apparatus body. The information processing apparatus main body includes a main control module which controls power activation of the storage drive based on a power activation operation by a power operation section. The storage drive includes a storage memory including a plurality of storage areas to and from which information can be written and read, a counter in which a count is incremented upon power activation, and a memory control module which stores a content of an access request in a storage area of the storage memory determined based on the count of the counter when the access request to the storage memory is made.

(Configuration of Information Processing Apparatus)

Figure 1:
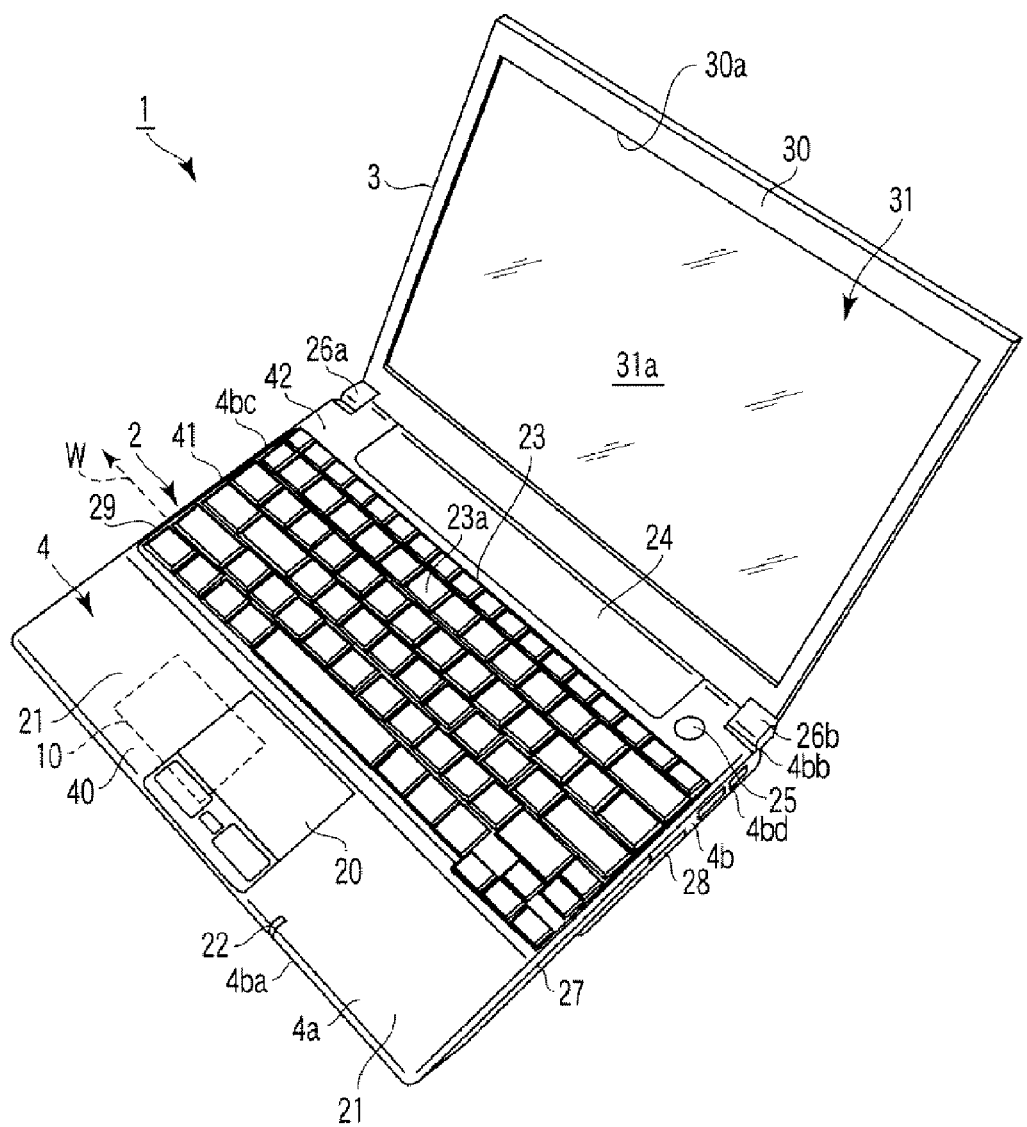
FIG. 1 is an exemplary perspective view showing an external appearance of an information processing apparatus according to an embodiment of the invention.

FIG. 1 is an exemplary perspective view showing an external appearance of an information processing apparatus according to an embodiment of the invention. The information processing apparatus 1 is composed of a main body 2 and a display unit 3 attached to the main body 2, as shown in FIG. 1.

The main body 2 has a box-shaped housing 4, and the housing 4 includes a top wall 4a, a peripheral wall 4b and a bottom wall (not shown). The top wall 4a of the housing 4 includes a front part 40, a central part 41 and a back part 42 which are arranged in order from a side close to a user who operates the information processing apparatus 1. The bottom wall is positioned opposite side of the top wall 4a, and faces an installation surface on which the information processing apparatus is placed. The peripheral wall 4b includes a front wall 4ba, a rear wall 4bb, and right and left sidewalls 4bc, 4bd.

The front part 40 includes a touch pad 20 which is a pointing device, a palm rest 21, and a liquid crystal display (LED) 22 which illuminates in conjunction with an operation of each of the components of the information processing apparatus 1.

The central part 41 includes a keyboard mounting part 23 on which a keyboard 23a capable of inputting character information, etc., is mounted.

The back part 42 includes a battery pack 24 which is detachably attached, a power switch 25 for turning on the power of the information processing apparatus 1 on the right side of the battery pack 24, and a pair of hinge portions 26a, 26b which rotatably supports the display unit 3 at the right and left sides of the battery pack 24.

An exhaust port 29 (not shown) for exhausting wind "w" from inside of the housing 4 to the outside thereof is disposed on the left sidewall 4bc of the housing 4. An optical disc drive (ODD) 27 capable of reading/writing data from/to an optical storage medium such as a DVD, and a card slot 28 in/from which various cards are inserted/removed are disposed on the right sidewall 4bd.

The housing 4 is formed of a housing cover including a part of the peripheral wall 4b and the top wall 4a, and a housing base including a part of the peripheral wall 4b and the bottom wall. The housing cover is detachably coupled to the housing base to form a housing space along with the housing base. The housing space houses a solid-state drive (SSD) 10, etc., as a non-volatile semiconductor memory drive. Details of the SSD 10 will be described later.

The display unit 3 includes a display housing 30 including an opening 30a and a display device 31 composed of an LCD, etc., capable of displaying images on a display 31a. The display device 31 is accommodated in the display housing 30, and the display 31a is exposed to the outside of the display housing 30 through the opening 30a.

In the housing 4, a main circuit board, an extension module, and a fan, not shown, as well as the SSD 10, the battery pack 24, the ODD 27, and the card slot 28.

FIG. 2 is an exemplary block diagram showing a schematic configuration of the information processing apparatus 1 according to the embodiment of the invention.

The information processing apparatus 1 includes, as shown in FIG. 2, an embedded controller (EC) 111 which is an embedded system for controlling each component, a flash memory 112 which stores a basic input/output system (BIOS) 112a, a south bridge 113 which is a large scale integration (LSI) chip and functions as various bus controllers and as an I/O controller, a northbridge 114, which is an LSI chip, for controlling connections among a central processing unit (CPU) 115 to be described later, a graphics processing unit (GPU) 116, a main memory 117 and various buses, a CPU 115 as a main control unit for computing various signals, a GPU 116 which controls and computes video signals for display, and a main memory 117 read and written by the CPU 115, as well as the SSD 10, the expansion module 12, the fan 13, the touchpad 20, the LED 22, the keyboard 23a, the power switch 25 as a power operation section, the ODD 27, the card slot 28 and the display device 31.

In a power-on operation, the power switch 25 turns on the power of each of the information processing apparatus 1 and the SSD 10 installed in the information processing apparatus 1 based on a press operation by the user. In order to perform a power-off operation, an end screen displayed on the display 31a of the display unit 3 is operated by the touchpad 20 based on a key operation via the keyboard 23a, for example, and thereby the power of each of the information processing apparatus 1 and the SSD 10 installed in the information processing apparatus 1 is turned off. In such power operations, the touchpad 20, the keyboard 23a, and the power switch 25 forms a power operation section.

The expansion module 12 includes an expansion circuit board, a card socket mounted on the expansion circuit board, and an extension module board inserted to the card socket. The card socket is based on the standards of Mini-PCI, etc., and the expansion module board may be a third generation (3G) module, a television tuner, a GPS module, or a Wimax™ module.

The fan 13 is a cooling unit which cools the inside of the housing 4 by means of ventilation, and exhausts the air in the housing 4 to the outside as wind "W" via the exhaust port 29 (not shown).

The EC 111, the flash memory 112, the south bridge 113, the north bridge 114, the CPU 115, the GPU 116 and the main memory 117 are the electronic components mounted on the main circuit board.

(Configuration of SSD)

FIG. 3 is an exemplary block diagram showing a schematic configuration of the SSD 10 according to the embodiment of the invention. The SSD 10 is schematically formed of a temperature sensor 101, a connector 102, a control unit 103, NAND memories 104A-104H, a DRAM 105, and a power supply circuit 106, as shown in FIG. 3. The SSD 10 is an external storage device which stores data and programs and from which records are not lost even if the power is not supplied thereto. Although the SSD 10 has no drive mechanism such as a magnetic disk or a head like a conventional hard disk drive, the SSD 10 stores program such as an operating system (OS), data generated by a user or executing software, etc., readably and securely in the storage areas of the NAND memories in the same way as that of the hard disk drive, and is a drive composed of a non-volatile semiconductor memory capable of operating as a boot drive of the information processing apparatus 1.

The control unit 103 as a memory controller is connected to each of the connector 102, the eight NAND memories 104A-104H, the DRAM 105 and the power supply circuit 106.

The control unit 103 is connected to a host apparatus 8 via the connector 102, and is connected to an external apparatus 9, as necessary. Further, the control unit 103 is provided with a power cycle counter (PCC) 103A which counts the number of times of power activation of the SSD 10.

A power supply 7 is a battery pack 24 or an AC adaptor, not shown, and 3.3V DC is supplied to the power supply circuit 106 via the connector 102, for example. Further, the power supply 7 supplies power to the entirety of the information processing apparatus 1.

The host apparatus 8 is a main circuit board in this embodiment, and the south bridge 113 mounted on the main circuit board is connected to the control unit 103. Data transmission is made between the south bridge 113 and the control unit 103 based on the standard of a serial ATA, for example.

The external apparatus 9 is an information processing apparatus different from the information processing apparatus 1. With respect to the SSD 10 detached from the information processing apparatus 1, the external apparatus 9 is connected to the control unit 103 based on standard of an RS-232C, for example, and has a function of reading data stored in the NAND memories 104A-104H.

The board on which the SSD 10 is mounted has, for example, the same outer shape and size as that of a hard disk drive (HDD) of a 1.8-inch type or 2.5-inch type. In this embodiment, the outer shape and size is the same as that of the 1.8-inch type.

The control unit 103 controls operations of the NAND memories 104A-104H. More specifically, the control unit 103 controls reading/writing of data from/to the NAND memories 104A-104H in response to a request from the host apparatus B. The data-transmission speed is 100 MB/sec in data reading and 40 MB/sec in data writing, for example.

Each of the NAND memories 104A-104H is, for example, a non-volatile semiconductor memory with 16 GB as a storage capacity, and is, for example, a multi level cell (MLC)-NAND memory (multi-value NAND memory) capable of 2-bit recording in one memory cell. The MLC-NAND memory generally has no advantage over rewritable times as compared with a signal level cell (SLC)-NAND memory, but the storage capacity can be easily increased.

The DRAM 105 is a buffer in which the data is temporarily stored at the time of data reading/writing from/to the NAND memories 104A-104H according to control of the control unit 103.

The connector 102 has a shape based on standards such as a serial ATA. The control unit 103 and the power supply circuit 106 may be connected to the host apparatus 8 and the power supply 7, respectively, via different connectors.

The power supply circuit 106 converts 3.3V DC supplied from the power supply 7 to 1.8V, 1.2V DC, for example, and supplies the three kinds of voltages to each component according to the drive voltage of each component of the SSD 10.

(Storage Capacity of SSD)

Figure 4:
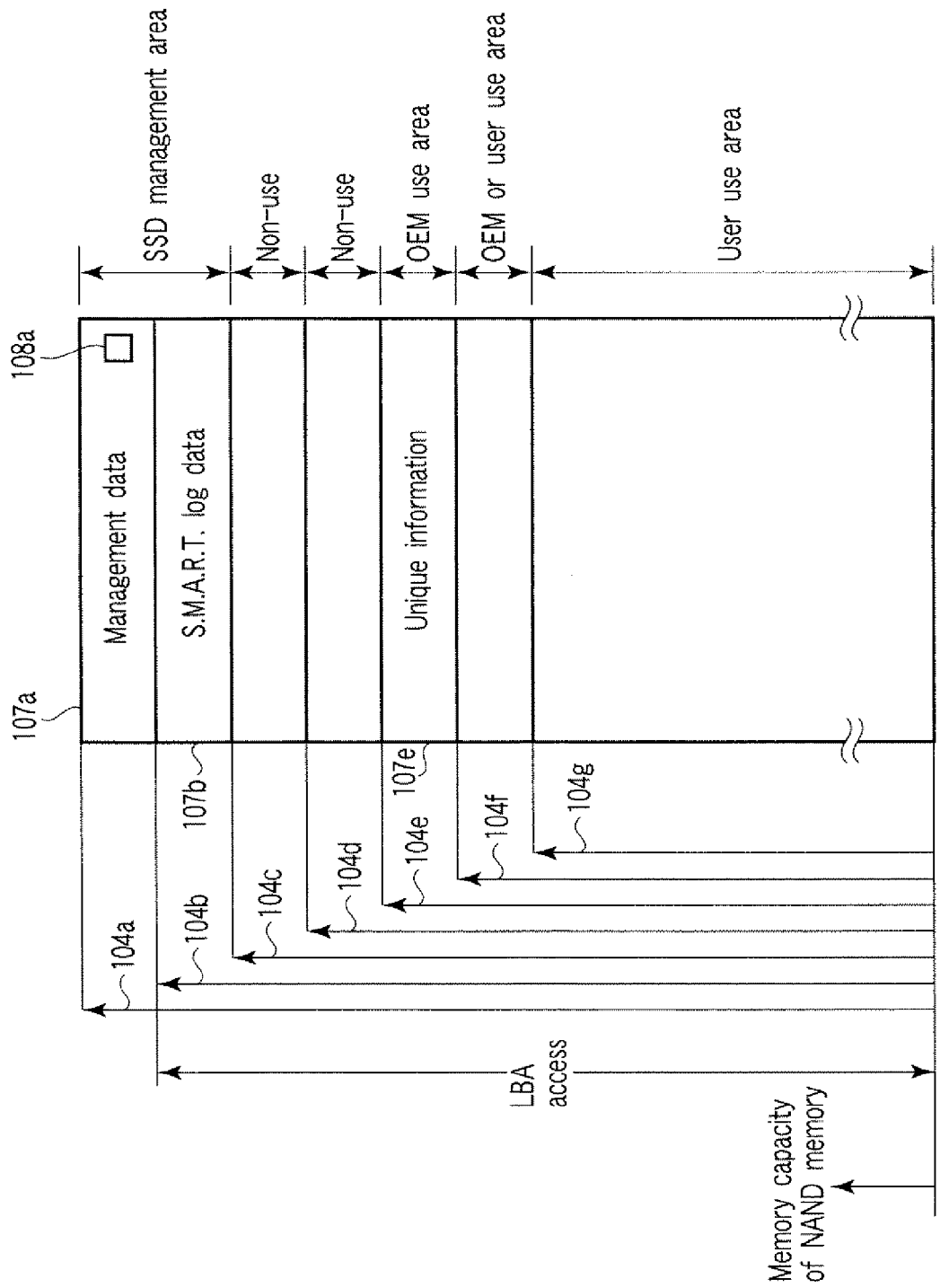
FIG. 4 is an exemplary schematic view showing storage capacities and storage areas of the SSD according to the embodiment.

FIG. 4 schematically shows storage capacities and storage areas of the SSD 10 according to the embodiment of the invention. The storage capacity of the SSD 10 is formed of storage capacities 104a-104g as shown in FIG. 4.

The storage capacity 104a is a NAND capacity, i.e., the maximum storage capacity using the storage areas of all the NAND memories 104A-104H. For instance, when the storage capacity of each of the NAND memories 104A-104H is 16 GB, the storage capacity 104a is 128 GB. The storage capacity 104a is given by NAND configuration information of a manufacturing information writing command of a universal asynchronous receiver transmitter (UART).

The storage capacity 104b is a Max Logical Capacity, and is the maximum storage capacity accessible by logical block addressing (LBA).

The storage capacity 104c is a self-monitoring analysis and reporting technology (S.M.A.R.T.) log area start LBA, and is provided for dividing the storage capacity 104b and the storage capacity 104d which will be described later. The details will be described later.

The storage capacity 104d is a Vendor Native Capacity, and is the maximum storage capacity given as a user use area. The storage capacity 104d is given by an initial Identify Device data of an ATA specific command. The storage capacity 104d is determined by the vendor at a design stage of the SSD 10 based on the International Disk Drive Equipment and Materials Association (IDEMA) standard, and is expressed by the following Equation 1:

$$LBA=97,696,368+(1,953,504\times((\text{Capacity in GB})-50))$$ Equation 1

The storage capacity 104e is an original equipment manufacturer (OEM) Native Capacity, and is the storage capacity determined at the time of manufacturing in response to a request from the OEM. The storage capacity 104e is given by writing unique information of an ATA specific command. The storage capacity 104e is a value returned by a Device Configuration Identify command when a Device Configuration Overlay Feature Set is supported.

The storage capacity 104f is a native capacity, and its initial value is the same value as the storage capacity 104e. The storage capacity 104f is a value which can be changed by a Device Configuration Set command when the Feature set is supported. Further, the storage capacity 104f is a value returned by a Read Native Max Address (EXT) command.

The storage capacity 104g is a Current Capacity, and is the storage capacity during use by the user. The initial value of the storage capacity 104g is the same value as the storage capacity 104f. The storage capacity 104g can be changed by a Set Max Address command. The value is returned by Word 61:60 and Word 103:100 of an Identify Device command.

The storage areas of the SSD 10 exist between adjacent ones of the storage capacities 104a-104g.

In a storage area between the storage capacities 104a and 104b, a management data (management information) 107a for operating SSD 10 and a logical/physical table 108a for converting a logical address of data converted from a LBA into a physical address corresponding to a sector which is a storage unit of the NAND memories 104A-104H are stored. The management data 107a and the logical/physical table 108a are data which cannot be accessed by using a LBA as a key, and is recorded, by using a fixed access path, in a fixed area in the NAND memories 104A-104H.

In a storage area between the storage capacities 104b and 104c, S.M.A.R.T. log data 107b which is statistical information of the forgoing temperature information, for example, is stored. The S.M.A.R.T. log data 107b is accessed by using the LBA as a key in being recorded inside of firmware, and is not be accessed by an ordinary Read command or a Write command from the host apparatus 8.

In a log management area header of the S.M.A.R.T. log data 107b, a count counted by the PCC 103A and based on power activation, a command trace pointer 0 and a command trace pointer 1 indicating a storage area in which a tracing result is stored at the time of command tracing are provided.

In a storage area between the storage capacities 104c and 104d, a non-used storage area having a storage capacity of 2 MB, for example, is set, for example. This is in order to handle the S.M.A.R.T. log data 107b and data recorded in the storage capacities 104d or later independently by providing a free storage area having a storage capacity of more than 1 MB, since a minimum storage unit of actual data is naturally 1 sector while a minimum storage unit of the LBA is 8 sectors and is the storage unit corresponding to 4 KB (a large storage unit is 1 MB).

A storage area between the storage capacities 104d and 104e is unused and the storage capacities 104d and 104e have the same value except in special cases.

A storage area between the storage capacities 104e and 104f is a storage area used by OEM, and the unique information 107e determined by a request from OEM is written as described above.

A storage area between the storage capacities 104f and 104g is a storage area used by OEM or the user, and data is written therein by setting by the OEM or user.

A storage area of the storage capacity 104g is a storage area used by the user, and data is written therein by setting by the user.

A storage capacities 104a-104g satisfy the relationship expressed by the following Equation 2:

$$\text{Storage capacity } 104a > \text{storage capacity } 104b > \text{storage capacity } 104c > \text{storage capacity } 104d >= \text{storage capacity } 104e > \text{storage capacity } 104f >= \text{storage capacity } 104g$$ Equation 2

At the time of shipping from a vendor, the storage capacities 104d-104g are the same values.

(Configuration of NAND Memory)

Figure 5:
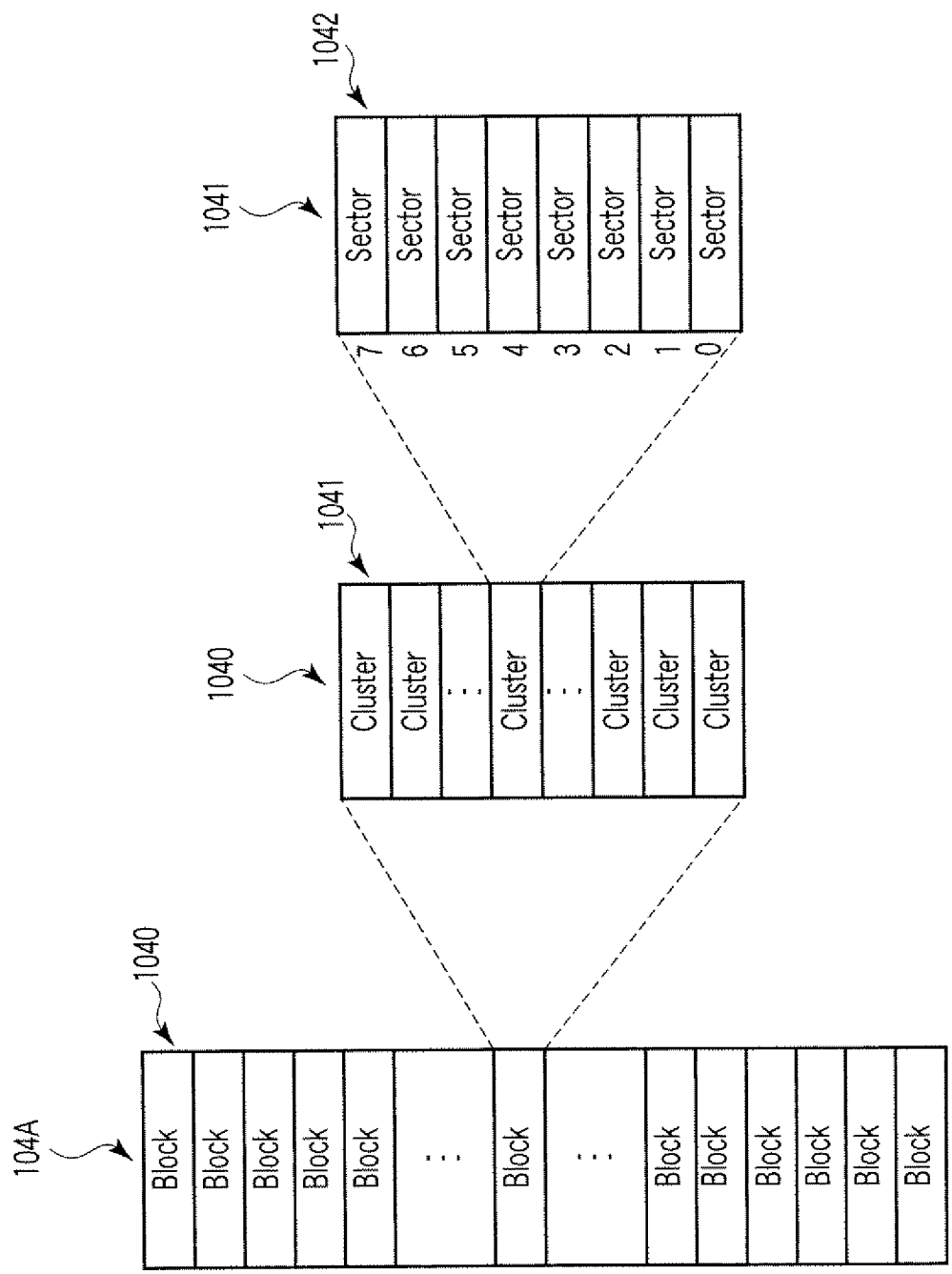
FIG. 5 is an exemplary schematic view of a NAND memory according to the embodiment.

FIG. 5 shows a schematic configuration of a NAND memory according to the embodiment of the invention. Since the NAND memories 104A-104H each have the same function and configuration, an explanation will be made only about the NAND memory 104A. As one example, it is assumed that numbers 0-7 at the left of a sector 1042 indicate sector numbers.

The NAND memory 104A is composed of a plurality of blocks 1040. Each of the blocks 1040 is composed of 1024 clusters 1041, and each of the clusters 1041 is further composed of 8 sectors 1042.

(Operation)

Figure 6:
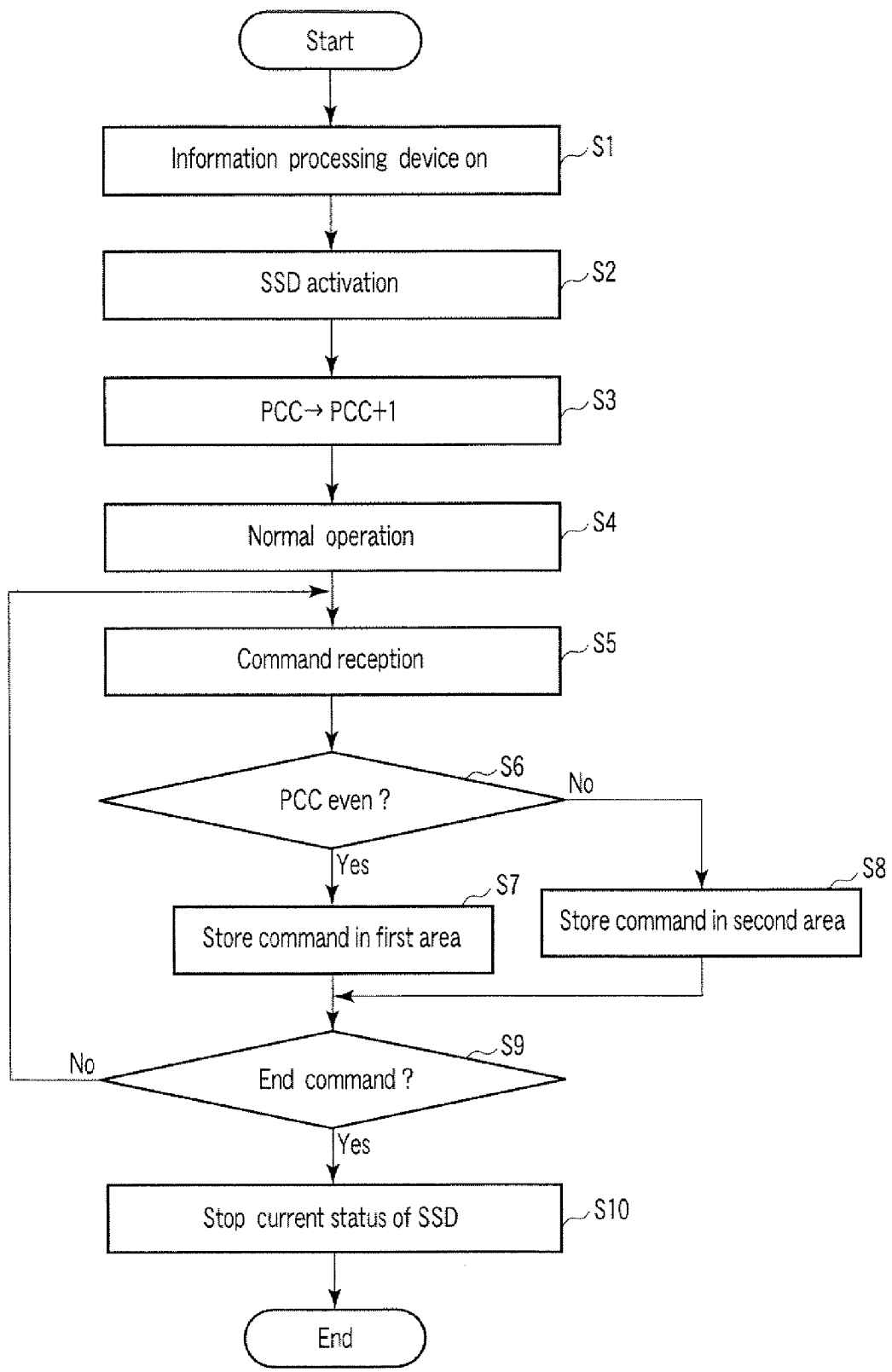
FIG. 6 is an exemplary flowchart showing command tracing in the information processing apparatus according to the embodiment.

FIG. 6 shows command tracing in the information processing apparatus 1 according to the embodiment of the invention. Hereinafter, a description will be made about the operation of the information processing apparatus 1 with reference to FIG. 1, FIG. 2, FIG. 3, FIG. 4. and FIG. 5.

First, the user operates the power switch 25 of the information processing apparatus 1 to turn on the power (S1). Thereby, an instruction for activation is given from the south bridge 113 to the SSD 10 (S2), and an OS stored in the NAND memories 104A-104H of the SSD 10 is read by the information processing apparatus 1 and activated. In the SSD 10, the PPC 103A is incremented by the control unit 103 (S3), and the temperature sensor 101, the NAND memories 104A-104H, and the DRAM 105 are energized. Next, in the control unit 103, a boot loader included in the management data 107a of the SSD 10 reads a firmware (FW) stored in the NAND memories 104A-104H in the DRAM 105 to load the firmware. The firmware loaded in the DRAM 105 further reads a storage state stored in the NAND memories 104A-104H. Thereafter, the SSD 10 performs a normal operation (S4).

In the information processing apparatus 1, upon receipt of a command as a request for access to the NAND memories 104A-104H based on an input operation from the keyboard 23a by the user, the control unit 103 of the SSD 10 confirms whether the count of the PCC 103A included in the log management area header is odd or even (S6). When the count of the PCC 103A is confirmed as even (Yes in S6), a command traced in a storage area predefined as a first storage area in the NAND memories 104A-104H is stored. In this command tracing, commands other than reading and a reset are traced. One record is 32 bytes and the nearest 256 commands are stored in a storage area at the time of execution of command tracing.

When the count of the PCC 103A is odd (No in S6), a command traced in a storage area predefined as a second storage area in the NAND memories 104A-104H is stored.

Upon receipt of a command (such as a Standby command) which ends the operation of the information processing apparatus 1 based on an input operation from the keyboard 23a by the user, for example, after completion of command tracing, the SSD 10 displays an end screen of the information processing apparatus 1 on the display 31a of the display device 31 and stores the current status in the NAND memories 104A-104H (S9). The term "state" denotes the storage state of information stored in the NAND memories 104A-104H according to the operation of the SSD 10.

Next, when the user performs a power-off operation, for example, via the keyboard 23a based on an end screen displayed on the display 31a, a power-off request signal is output to the CPU 115 via the south bridge 113. The CPU 115 ends the operation of each of the components of the information processing apparatus 1 based on the power-off request signal and interrupts supply of power to the SSD 10 to end the operation.

By thus referring to the count of the PPC 103A when the result of command tracing is stored in the NAND memories 104A-104H, and storing the result in the first storage area of the NAND memories 104A-104H when the count is even, and storing the result in the second storage area of the NAND memories 104A-104H when the count is odd, the result of command tracing executed at the time of previous activation can be stored.

That is, by storing the result of command tracing in a storage area different from the storage area in which the result of command tracing at the time of the previous activation is stored, fault analysis can be reliably performed.

In the above-described command tracing, the tracing result of command tracing is stored in the first storage area or second storage area according to whether the count of PCC 103A is even or odd. However, the storage areas are not limited to the above described ones. For example, first to nth storage areas may be configured to store results in a predetermined order.

As for the method for storage, the same trace result may be stored in a plurality of storage areas, by storing the tracing result of command tracing in a plurality of storage areas provided as a first storage area when the count of the PCC 103A is even, and storing the tracing result of command tracing in a plurality of storage areas provided as a second storage area when the count of the PCC 103A is odd. Thereby, the tracing result of the command tracing can be stored more reliably Further, the above-described selection of the storage area based on the count of the PCC 103A is not limited to storage of the tracing result of command tracing, but can be applied to other information storage methods such as storage of event logs.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage drive accommodated in an information processing apparatus main body, comprising:
    a storage memory comprising a plurality of storage areas to and from which information can be written and read;
    a counter configured to count a number of times of power activation of the storage drive; and
    a memory control unit configured to store a trace result in one of the plurality of storage areas in the storage memory when an access request to the storage memory is received, the memory control unit determining the one of the plurality of storage areas based on the count of the counter such that the trace result is stored in one of the plurality of storage areas different from another of the plurality of storage areas in which a trace result from the previous power activation is stored.

2. The storage drive of claim 1, wherein the storage drive is a non-volatile semiconductor memory drive.

3. The storage drive of claim 1, wherein:
    the plurality of storage areas comprise a first storage area and a second storage area; and
    the memory control unit is configured to store the trace result in the first storage area when the count of the counter at the time the access request is made is even, and to store the trace result in the second storage area when the count of the counter at the time the access request is made is odd.

4. The storage drive of claim 1, wherein the memory control unit is configured to store the trace result in one or more storage areas provided as a first storage area of the storage memory when the count of the counter at the time the access request is made is even, and to store the trace result in one or more storage areas provided as a second storage area of the storage memory when the count of the counter at the time the access request is made is odd.

5. An information processing apparatus comprising:
   an information processing apparatus main body; and
   a storage drive which is accommodated in the information processing apparatus main body, wherein:
   the information processing apparatus main body comprises a main control unit configured to control power activation of the storage drive based on a power activation operation by a power operation portion, and
   the storage drive comprises:
      a storage memory comprising a plurality of storage areas,
      a counter configured to count a number of times of power activation of the storage drive, and
      a memory control unit configured to store a trace result in one of the plurality of storage areas in the storage memory when an access request to the storage memory is made, the memory control unit determining the one of the plurality of storage areas based on the count of the counter such that the trace result is stored in one of the plurality of storage areas different from another of the plurality of storage areas in which a trace result from the previous power activation is stored.

6. The information processing apparatus of claim 5, wherein the storage drive is a non-volatile semiconductor memory drive.

7. The information processing apparatus of claim 5, wherein:
   the plurality of storage areas comprise a first storage area and a second storage area; and
   the memory control unit of the storage drive is configured to store the trace result in the first storage area when the count of the counter at the time the access request is made is even, and to store the trace result in the second storage area when the count of the counter at the time the access request is made is odd.

8. The information processing apparatus of claim 5, wherein the memory control unit of the storage drive is configured to store the trace result in one or more storage areas provided as a first storage area of the storage memory when the count of the counter at the time the access request is made is even, and to store the trace result in one or more storage areas provided as a second storage area of the storage memory when the count of the counter at the time the access request is made is odd.

* * * * *